United States Patent [19]
Mack
[11] Patent Number: 5,053,270
[45] Date of Patent: Oct. 1, 1991

[54] NON-WOVEN FABRIC CONSTRUCTION FOR DETERGENT POUCH

[75] Inventor: Robert J. Mack, Flemington, N.J.

[73] Assignee: Colgate-Palmolive Co., Piscataway, N.J.

[21] Appl. No.: 525,788

[22] Filed: May 18, 1990

[51] Int. Cl.[5] ........................... C11D 9/42; B32B 7/00
[52] U.S. Cl. ..................................... 428/35.2; 252/90; 252/91; 252/92; 428/287; 428/290; 428/296; 428/196; 428/36.1; 428/280; 428/300; 428/360; 428/291; 428/288
[58] Field of Search ............... 428/284, 288, 287, 286, 428/360, 198, 35.2, 36.1; 252/290, 292, 90, 91

[56] References Cited

U.S. PATENT DOCUMENTS 4,555,354 8/1984 Clarke et al. ......................... 252/90
4,830,904 11/1987 Gressner et al. .................... 428/288

*Primary Examiner*—George F. Lesmes
*Assistant Examiner*—Richard C. Weisberger
*Attorney, Agent, or Firm*—Michael J. McGreal; Murray M. Grill; Robert C. Sullivan

[57] ABSTRACT

A laundry detergent pouch comprising a non-woven web of non-woven sensitive material normally having interstices capable of passing laundry detergent powder. The web is compressed and bonded, while compressed, to hold the fibers in compressed condition filling the interstices to prevent passage of detergent powder outwardly thereof.

17 Claims, 1 Drawing Sheet

NON-WOVEN FABRIC CONSTRUCTION FOR DETERGENT POUCH

BACKGROUND OF THE INVENTION

1. Field of the Invention

This invention relates to a non-woven fabric construction and, more particularly, to a non-woven material especially adaptable for use as a detergent pouch.

2. Description of the Prior Art

Many users of automatic laundry machines prefer to use pouches of detergent because such provides ease of use, reduces waste of detergent by providing a premeasured amount of detergent compatible with the capacity of the average washing machine, while also eliminating contact of the detergent with the hands of the user, and facilitates general neatness of the laundry area.

However, in the past, various difficulties have arisen with the pouches of the prior art since the fabric of some pouches fail to hold detergent powder therein, while others have openings too small to allow for full passage of the detergent into the washing liquid.

U.S. Pat. No. 4,188,304, discloses the use of laundry pouches having water sensitive side seals which cause the construction to open at one or more seams when immersed.

In another U.S. Pat. No. 4,555,354, there is taught the use of mechanically weak seals which become unsealed due to the agitating action of the washing machine. Rough handling of this product during transportation and merchandising can lead to failure of the seals prematurely.

U.S. Pat. No. 4,348,293 relates to water soluble sheets or coatings adhered to the porous non-woven substrate which, when dissolved, permit the transport of the detergent powders through the intersticed spacings.

SUMMARY OF THE INVENTION

The present invention overcomes the disadvantages of prior art pouches by utilizing an advantageous non-woven material, which is mechanically and chemically treated to prevent outward passage of even the smallest particles of conventional detergents while dry, yet in which the interstitial spacing is widely enlarged when disposed in laundry liquid.

To this end, a non-woven sheet of non-water sensitive material or hydrophobic material, such as polyester or polypropylene, is provided. Then, this material is compressed and flattened, while being simultaneously bonded, to maintain this shape by a water sensitive binder. The material is then manufactured into a pouch, which is filled with detergent powder. When immersed in the liquid of a laundering machine, the binder dissolves and the compressed and flattened material resumes substantially its original shape permitting passage of detergent powder outwardly of the pouch.

DETAILED DESCRIPTION OF THE INVENTION

Figure 1:
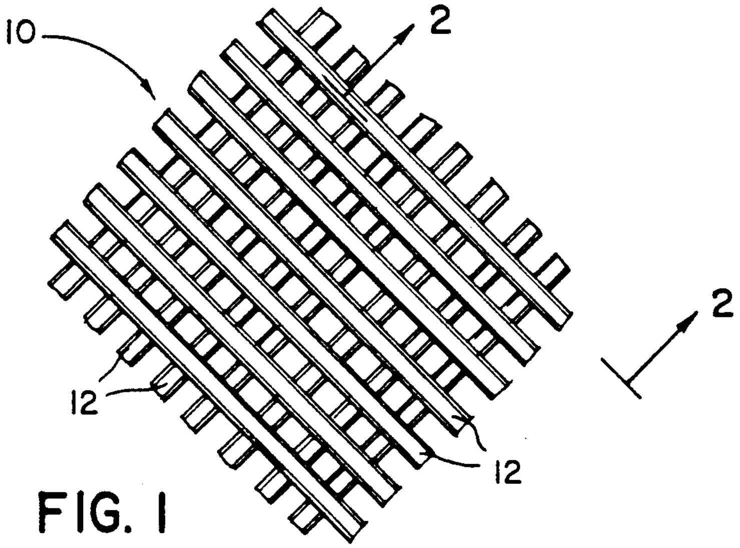
FIG. 1 is a plan view of a portion of the non-woven material during an initial stage in the manufacture thereof.
Figure 2:
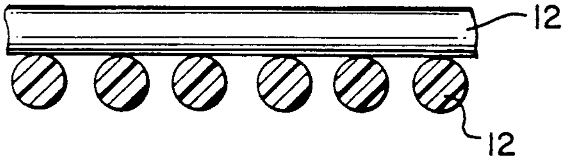
FIG. 2 is a sectional detail view taken along the plane of line 2—2 in FIG. 1.
Figure 3:
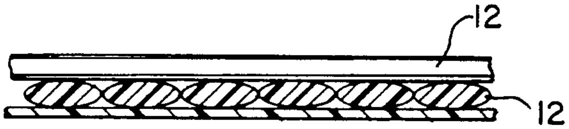
FIG. 3 is a view, similar to FIG. 2, after the non-woven material of FIG. 2 has been compressed and bonded; and, FIG. 4 is a perspective view of a pouch used in the invention.
Figure 4:
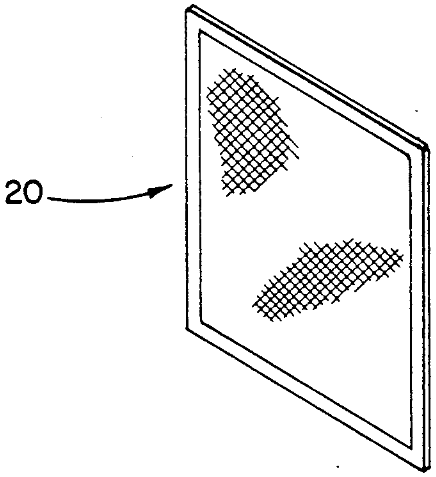

With continuing reference to the accompanying drawing, wherein like reference numerals designate similar parts in the various views, reference numeral 10 generally designates a non-woven material formed of non-water sensitive fibers, such as those hydrophobic materials including polyester and polypropylene. The fibers 12 are of staple length and are arranged into a web of sheet construction using techniques, such as fiber carding, air laying, needle punching, felting or the like. The sheet thickness or interfiber spacing is adjusted so that the largest particles encountered in laundry detergent powder will pass through the material 10. The fibers comprising the sheet are then bonded together by chemical print bonding, heat pattern bonding, sheet saturation bonding or the like, so that the fibers 12 are flattened and compressed to fill the interstices, which bonding material, such as a conventional water-sensitive or soluble gum or adhesive, including casein, fill all remaining interstices. Thus, sufficient dry strength is achieved so that product integrity is attained during all stages of manufacturing of the pouch generally indicated at 20. In one embodiment the fibers are compressed such that the flattened fibers fill the interstices between the fibers. The fibers are then bonded with a bonding agent to hold the fibers in the flattened condition. The binding agent may be a water soluble binding agent or a frangible or weak binding agent which breaks by the mechanical action of the washing machine to allow the fibers to return to their natural uncompressed state so that the detergent particles can pass through the interstices.

The non-water sensitive fibers are selected from any of those fibers which, when wetted, do not lose their ability to hold their high to medium crimping and are selected from polyester, polypropylene or any combination or blends of the aforesaid fibers.

The web is compressed through compression rolls or belts so that the fiber spacings are reduced to such a degree that detergent powder of the smallest particle size to be encountered are effectively prevented from passing through the material 10. The sheet is then bonded in the compressed state with the water sensitive binder or a binder which can be mechanically disrupted.

When a pouch constructed of this material is wetter or subjected to agitation, respectively, the forces and binder holding the web in its compressed state are then eliminated in the laundering machine during the washing cycle allowing the material to expand to its original state, as in FIG. 1, thus permitting the enclosed detergent powder to be dispersed into the washing liquid.

Thus, no separate use of costly glues or adhesives for bonding the seams of the pouch 20 are required, the pouch being constructed by heat sealing, sonic welding, bonding or other simple means of manufacture.

What is claimed is:

1. A laundry detergent pouch comprising a web of non-water sensitive non-woven fibers, said fibers normally having interstices therebetween which pass detergent particles, said fibers being compressed to fill said interstices and bonded with a binder to hold said fibers in the compressed condition thereby preventing passage of said particles, wherein said binder releases said compressed fibers when said pouch is laundered whereby said fibers return to an uncompressed state and said detergent particles can pass through said interstices.

2. The laundry detergent pouch of claim 1, wherein the binder used is a water sensitive or water soluble binder.

3. The laundry detergent pouch of claim 1, wherein said binder is a frangible binder and breaks when agitated in a laundry machine thereby allowing said fibers to return to an uncompressed state.

4. The laundry detergent pouch of claim 1, wherein said fibers are of polyester.

5. The laundry detergent pouch of claim 1, wherein said fibers are of polypropylene.

6. The laundry detergent pouch of claim 1, wherein said fibers are a blend of polyester and polypropylene.

7. The laundry detergent pouch of claim 1, wherein the binder used is a water sensitive or water soluble binder, said fibers being of polyester.

8. The laundry detergent pouch of claim 1, wherein the binder used is a water sensitive or water soluble binder, said fibers being a blend of polyester and polypropylene.

9. The laundry detergent pouch of claim 1, wherein the binder used is a water sensitive or water soluble binder, said fibers being of a blend of polyester fibers and polypropylene fibers.

10. A laundry detergent pouch containing solid laundry detergent particles, wherein said pouch is formed from a compressd a non-woven web of non-water sensitive fibers, wherein said web has interstices between said fibers of a size to allow said detergent particles to pass through when said web is in an uncompressed condition and wherein said compressed web is formed by compressing said fibers to form flattened fibers and to substantially close said interstices and bonding said fibers with a binding agent to retain said fibers in said flattened condition wherein said binding agent releases said fibers during a laundering step whereby said fibers return to said uncompressed condition to release said detergent particles.

11. The pouch of claim 10 wherein said binding agent is a water soluble adhesive capable of dissolving in wash water to allow said fibers to return to said uncompressed condition.

12. The pouch of claim 10 wherein said binding agent is a frangible binding agent capable of breaking by mechanical action in a laundering step.

13. The pouch of claim 10 wherein said binding agent fills interstices between said flattened fibers.

14. The pouch of claim 10 wherein said fibers are flattened to close said interstices whereby sitting of the detergent particles is inhibited.

15. A laundry detergent pouch containing solid detergent particles, wherein said pouch is formed from a compressed fiber web, said compressed fiber web comprising a non-woven fiber web having interstices to allow said detergent particles to pass through said web when in an uncompressed condition, said non-woven fiber web further containing a water soluble adhesive and being in a compressed condition whereby said fibers are flattened to substantially close said interstices thereby preventing said detergent particles from passing through, said water soluble adhesive retaining said fibers in said flattened condition and wherein said water soluble adhesive is soluble in wash water to allow said flattened fibers to return to said uncompressed condition.

16. The pouch of claim 15 wherein said non-woven web is formed from fibers selected from the group consisting of polyester fibers, polypropylene fibers and mixtures thereof.

17. The pouch of claim 15 wherein said adhesive substantially closes interstices between said flattened fibers.

* * * * *